Sept. 6, 1932.  H. BORMANN  1,876,485
TRACTOR ATTACHMENT
Filed Sept. 5, 1930  2 Sheets-Sheet 1
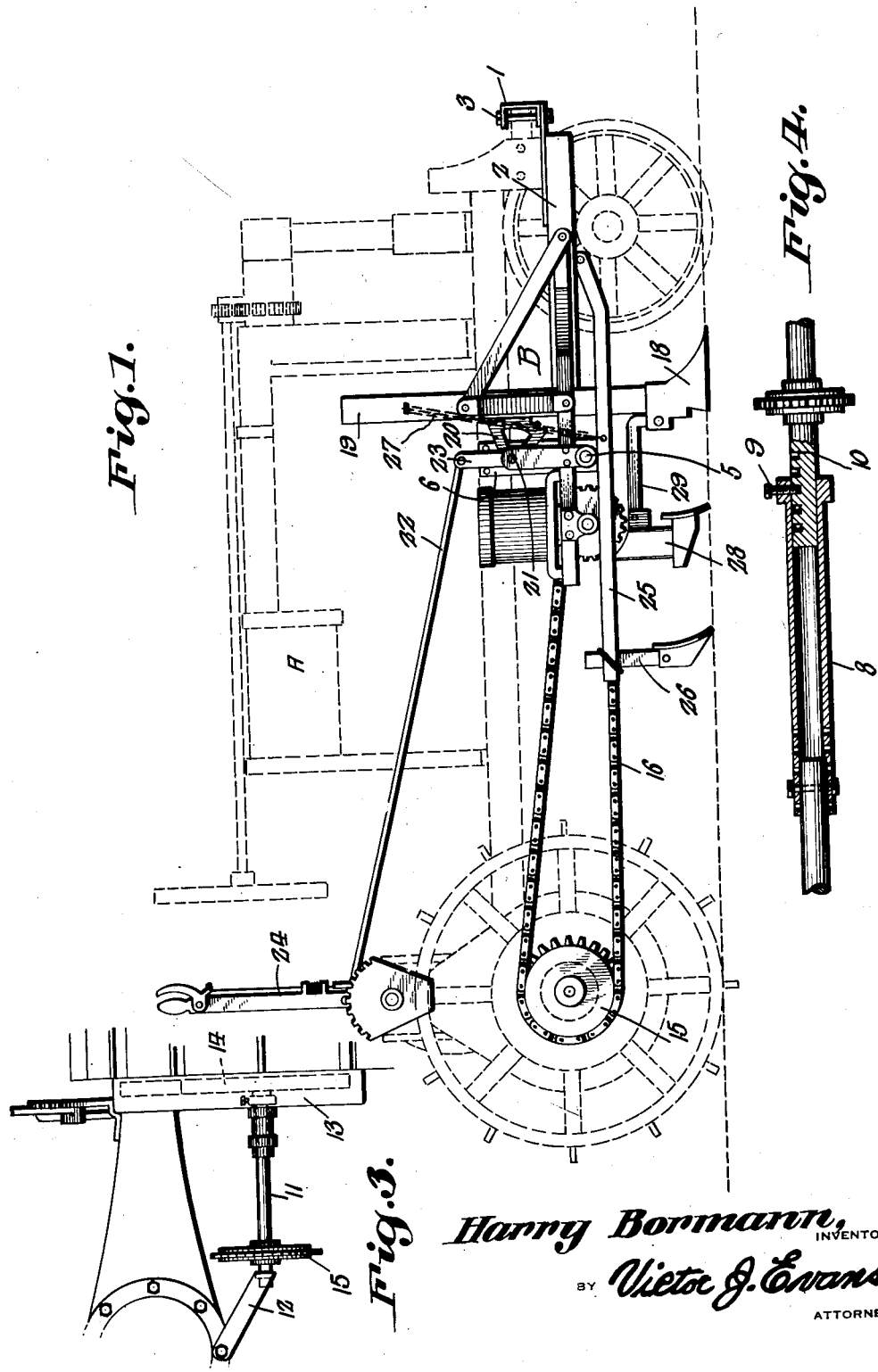
Harry Bormann, INVENTOR
BY Victor J. Evans
ATTORNEY Sept. 6, 1932.   H. BORMANN   1,876,485
TRACTOR ATTACHMENT
Filed Sept. 5, 1930   2 Sheets-Sheet 2
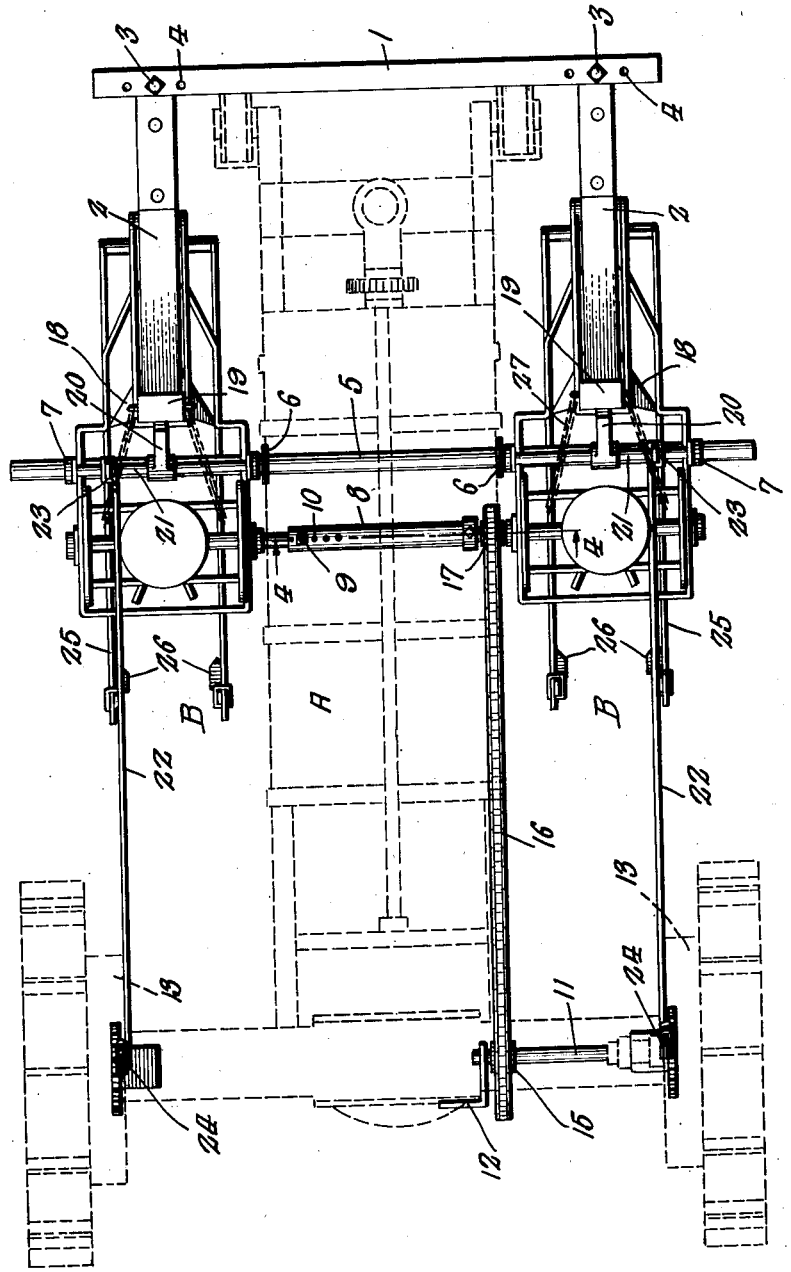

Patented Sept. 6, 1932

1,876,485

UNITED STATES PATENT OFFICE

HARRY BORMANN, OF SEGUIN, TEXAS

TRACTOR ATTACHMENT

Application filed September 5, 1930. Serial No. 480,011.

This invention relates to means for attaching planters to a tractor, the general object of the invention being to provide cross bars attached to the tractor and to which the planters are adjustably connected so that the planters can be adjusted toward and away from each other to vary the distance apart of the rows and also to provide means for operating both planters from the tractor.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view showing the planters connected with the tractor.

Figure 2 is a top plan view.

Figure 3 is a fragmentary rear view showing the means for operating a planter from one of the ground wheels of the tractor.

Figure 4 is a section on line 4—4 of Figure 2.

In these drawings, the letter A indicates the tractor and the letters B a pair of planters arranged one at each side of the tractor. A cross bar 1 is suitably connected with the front of the tractor and the tongue 2 of each planter is pivoted to the bar by the bolt 3 which passes through the front end of the tongue and through any one of a number of holes 4 in the bar so that the planter can be adjusted toward and away from the tractor. A bar 5 is supported in the hangers 6 depending from the sides of the tractor and the intermediate portions of the frames of the planter are connected with the bar by the adjustable collars 7. Thus the planters can be adjusted toward and away from the tractor to vary the distance between the rows being planted.

A telescopic shaft 8 has its ends connected with the feeding means of the planters, the bar extending under the tractor and the two parts of the bar are adjustably connected together by the bolt 9 which may be passed through any one of a number of holes 10 in one bar so that the bar can be adjusted to suit the adjustment of the planters toward and away from each other.

A short shaft 11 is supported under a part of the rear axle housing of the tractor by the bracket 12 connected with a part of the housing and by the gear casing 13 associated with one of the rear wheels of the tractor. This shaft is driven from the ring gear of the wheel by the gear 14 which meshes with the ring gear and the shaft 11 carries a sprocket 15 over which a chain 16 passes, the chain also passing over a sprocket 17 on the shaft 8. Thus the feeding means of the planters are driven from one of the wheels of the tractor.

The plow 18 of each planter is attached to the lower end of a vertically movable bar 19 in the planter which is raised and lowered through means of the quadrant 20 engaging teeth on the bar and this quadrant is rocked on its pivot 21 by a link 22 which connects the arm 23 of the quadrant with a hand lever 24 pivoted at the rear part of the tractor, adjacent the seat thereof. A beam 25 is pivoted to the frame of each planter and the covering plows 26 are adjustably fastened to the lower ends of the beam. This beam is connected by a flexible member 27 with the bar 19 so that the beam will move with the bar.

The boot 28 of each planter is connected to the plow 18 by the link 29 so that the boot will be raised and lowered with the plow.

From the foregoing it will be seen that the planters can be adjusted toward and away from each other so as to vary the distance between the rows being planted and that the feeding means of the planters are operated by a shaft which is adjustable as to its length and which is driven from one of the ground wheels of the tractor, with manually operated means for raising and lowering the plow, the boot and the covering plow of each planter, as desired.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In a tractor attachment of the kind described, a pair of planters adapted to be arranged at opposite sides of a tractor and each having a forwardly extending tongue, a channeled cross bar suitably mounted forwardly upon the tractor and receiving in its channel the tongues, coupling pins engaged with the cross bar and tongues for adjustably connecting the same, feeding means in each planter, a coupling common to the feeding means and connected therewith of both planters for operation in unison, driven connections between the coupling and a power wheel of the tractor, and manually operable means for the respective planters to independently adjust the same relative to a ground surface.

2. In a tractor attachment of the kind described, a pair of planters adapted to be arranged at opposite sides of a tractor and each having a forwardly extending tongue, a channeled cross bar suitably mounted forwardly upon the tractor and receiving in its channel the tongues, coupling pins engaged with the cross bar and tongues for adjustably connecting the same, feeding means in each planter, a coupling common to the feeding means and connected therewith of both planters for operation in unison, driven connections between the coupling and a power wheel of the tractor, manually operable means for the respective planters to independently adjust the same relative to a ground surface, said feeding means each including a shaft, said shafts being arranged in opposed alignment with each other, said coupling being in the form of a tube telescopically engaged over the shafts and adjustably secured thereto.

In testimony whereof I affix my signature.

HARRY BORMANN.